Patented Nov. 27, 1951

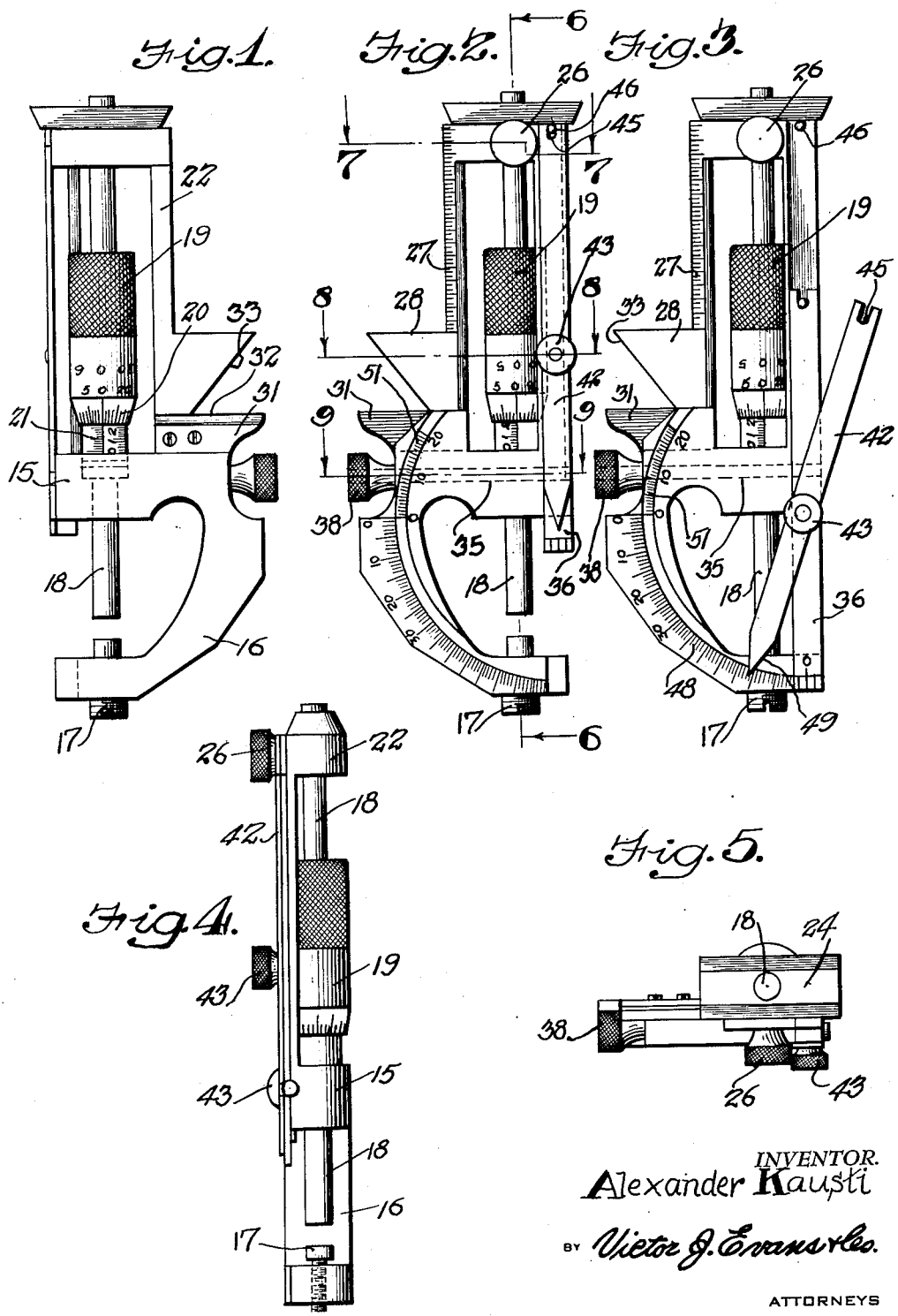

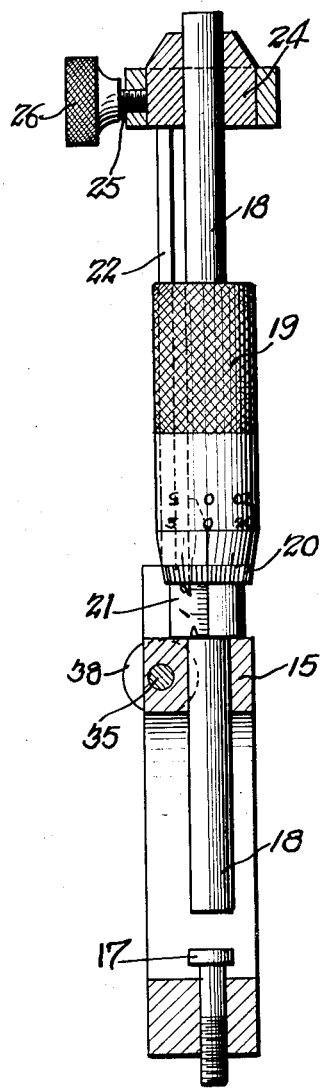
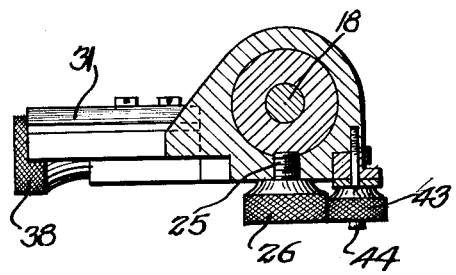
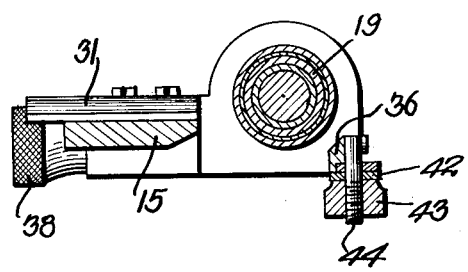
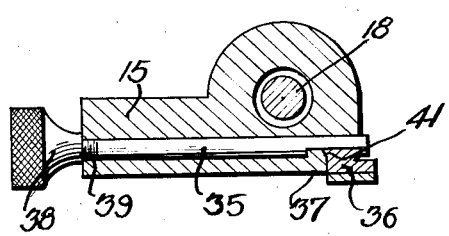

2,576,606

UNITED STATES PATENT OFFICE 2,576,606

COMBINATION MICROMETER

Alexander Kausti, Los Angeles, Calif.

Application August 4, 1948, Serial No. 42,359

1 Claim. (Cl. 33—75)

This invention relates to an engineer's instrument.

It is an object of the present invention to provide an engineer's instrument including a micrometer, a protractor, a square, a center gauge and a depth micrometer, wherein with the one instrument, an engineer, draftsman, or inspector will have available all five tools which may be kept in a single pocket and wherein little time is lost when changing from one tool to the other and wherein there is little opportunity for tools to become displaced and made unavailable when needed.

Other objects of the present invention are to provide a combined tool or instrument adapted for performing the above several operations, which is of simple construction, easy to adjust and adapt to the work piece, inexpensive to manufacture, convenient to use and efficient in operation.

For other objects and for a better understanding of the invention, reference may be had to the following detailed description taken in connection with the accompanying drawing, in which Fig. 1 is a side elevational view of the instrument embodying the features of the present invention.

Fig. 2 is a side elevational view of the instrument looking from the opposite direction.

Fig. 3 is a side elevational view similar to Fig. 2, but with the protractor lever extended outwardly for use.

Fig. 4 is an edge elevational view of the instrument.

Fig. 5 is a top plan view.

Fig. 6 is an enlarged sectional view, in elevation, taken on line 6—6 of Fig. 2.

Figs. 7, 8 and 9 are respectively transverse sectional views taken on lines 7—7, 8—8 and 9—9 respectively of Fig. 2.

Referring now to the figures, 15 represents a main body having a jaw portion 16 with an adjustable head 17 on its lower end and a measuring member 18 which is adjusted by knurled handle 19. This handle has a vernier scale 20 thereon and will cooperate with a scale 21 in order that the gauge can be set for the desired measurement. The work piece is placed between the head 17 and the member 18 and within the jaw 16.

The body 15 has an upwardly extending portion 22 through which member 18 extends. If it is desired to take a measurement to determine the depth of an opening or hole, the member 18 is extended through a collar 24 in the portion 22. This collar is normally retained against displacement relative to the portion 22 by a set screw 25 with a knurled knob 26. Along one edge of the upstanding portion 22 is a scale 27 adapted to cooperate with an outwardly extending edge section 28 to provide a square.

To provide for a center gauge, there is connected to the upstanding portion 22 a member 31 having an edge 32 and above this edge is an inclined edge 33.

Extending through the body is a clamping rod 35 for a protractor plate or slide 36. This rod 35 is recessed as indicated at 37, Fig. 9, and when tightened by turning knob 38 on its outer thread portion 39, the end of the slot will engage with dove tail edge of the slide 36 as indicated at 41. The slide can then be adjusted from its elevated position free of the jaw opening and as shown in Fig. 2 to a position where it is extended across the jaw opening. Arm 42 is normally retained tight on the slide 36 by a clamping nut 43 threaded on a post 44, Fig. 8. Thereafter, the arm can be swung outwardly at an angle as shown in Fig. 3 and an arc drawn to the angle desired by locating a pencil point in a slotted end 45. This slotted end when the slide is raised may cooperate with a pin 46 to hold the pivot arm member 42 against pivotal movement.

As soon as the protractor has served its purpose, the arm 42 can be fixed to the slide 36 and elevated to its raised position and locked by the rod 35.

The turning knob 19 is of the usual micrometer construction. It is rotated to effect the adjustment of the rod 18. A scale 48 is provided on the side of the jaw with which pointed end 49 of arm 42 may cooperate to give an angle reading. A negative reading can be taken up to twenty degrees as indicated at 51.

It should now be apparent that there has been provided an instrument which may serve many purposes. Many different types of measurement can be had with this same instrument.

While various changes may be made in the detail construction, it shall be understood that such changes shall be within the spirit and scope of the present invention as defined by the appended claim.

I claim:

A measuring instrument comprising a body provided with a jaw portion, said jaw portion being provided with an arcuate scale thereon, there being an upwardly extending portion on said body, a plate slidably connected to said body and provided with a slot, means for maintaining said plate immobile in its adjusted position, an arm arranged contiguous to said plate, a post pivotally connecting said arm to said plate, one end of said arm provided with a pointed end, and the other end of said arm being provided with a slot, a pin projecting from said body for engagement with the slot in said plate, the pointed end of said arm adapted to coact with the scale on said jaw portion.

ALEXANDER KAUSTI.

REFERENCES CITED

The following references are of record in the file of this patent:

UNITED STATES PATENTS

| Number | Name | Date |
| --- | --- | --- |
| 601,721 | Vine | Apr. 5, 1898 |
| 709,487 | Hughes | Sept. 23, 1902 |
| 747,224 | Rieffel | Dec. 15, 1903 |
| 939,562 | Spahn | Nov. 9, 1909 |
| 982,793 | Burrage | Jan. 31, 1911 |
| 1,389,381 | Renton | Aug. 30, 1921 |
| 1,405,285 | Church | Jan. 31, 1922 |
| 1,453,067 | Felske | Apr. 24, 1923 |

FOREIGN PATENTS

| Number | Country | Date |
| --- | --- | --- |
| 336,963 | France | Feb. 2, 1904 |
| 493,081 | France | Mar. 30, 1921 |
| 598,910 | Germany | June 21, 1934 |
| 653,355 | France | Nov. 8, 1928 |